United States Patent
Shreevastav et al.

(10) Patent No.: US 11,172,486 B2
(45) Date of Patent: Nov. 9, 2021

(54) NETWORK NODE AND METHOD IN A WIRELESS COMMUNICATIONS NETWORK

(71) Applicant: Telefonaktiebolaget LM Ericsson (publ), Stockholm (SE)

(72) Inventors: Ritesh Shreevastav, Upplands Väsby (SE); Sofia Brismar, Lidingö (SE); Andreas Höglund, Solna (SE); Yutao Sui, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/627,390

(22) PCT Filed: Jun. 28, 2018

(86) PCT No.: PCT/SE2018/050700
§ 371 (c)(1),
(2) Date: Dec. 30, 2019

(87) PCT Pub. No.: WO2019/032005
PCT Pub. Date: Feb. 14, 2019

(65) Prior Publication Data
US 2020/0221442 A1    Jul. 9, 2020

Related U.S. Application Data

(60) Provisional application No. 62/542,858, filed on Aug. 9, 2017.

(51) Int. Cl.
*H04W 72/04* (2009.01)
*H04W 24/10* (2009.01)
(Continued)

(52) U.S. Cl.
CPC ......... *H04W 72/048* (2013.01); *H04W 24/10* (2013.01); *H04W 68/02* (2013.01);
(Continued)

(58) Field of Classification Search
CPC ... H04W 72/048; H04W 24/10; H04W 68/02; H04W 72/005; H04W 72/0413; H04W 74/008; H04W 74/0833; H04W 28/26
See application file for complete search history.

(56) References Cited

U.S. PATENT DOCUMENTS 8,279,810 B1 * 10/2012 Li ........................... H04L 45/22
370/328
9,414,298 B1 * 8/2016 Pasupuleti ............ H04W 48/16
(Continued)

FOREIGN PATENT DOCUMENTS

| RU | 2015120928 A | 12/2016 |
|---|---|---|
| WO | 2015140039 A1 | 9/2015 |
| WO | 2018029643 A1 | 2/2018 |

OTHER PUBLICATIONS

Unknown, Author, "3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.3.0, Jun. 2016, pp. 1-107.
(Continued)

*Primary Examiner* — Brian T O Connor
(74) *Attorney, Agent, or Firm* — Christopher & Weisberg, P.A.

(57) ABSTRACT

A method performed by a network node, for planning radio resources for transmissions is provided. The network node establishes (301) that a wireless device is fixed, wherein fixed comprises always being served by the same one or more access points. The network node obtains (302) a configuration comprising an identity of the wireless device and associated parameters to be used for transmissions between the network node and the wireless device. The parameters comprise an identity of the one or more access points serving the wireless device. The parameters further (Continued)

comprise any one or more out of: Time and periodicity, for transmissions between the network node and the wireless device. Based on the configuration, the network node plans (303) radio resources available in the network node for upcoming transmissions between the network node and any wireless device.

18 Claims, 11 Drawing Sheets

(51) Int. Cl.
*H04W 68/02* (2009.01)
*H04W 72/00* (2009.01)
*H04W 74/00* (2009.01)
*H04W 74/08* (2009.01)

(52) U.S. Cl.
CPC ..... *H04W 72/005* (2013.01); *H04W 72/0413* (2013.01); *H04W 74/008* (2013.01); *H04W 74/0833* (2013.01)

(56) References Cited

U.S. PATENT DOCUMENTS

| | | | |
|---|---|---|---|
| 2013/0138807 A1 | 5/2013 | Perkuhn et al. | |
| 2014/0293915 A1 | 10/2014 | Pelletier et al. | |
| 2015/0282020 A1* | 10/2015 | Pajukoski | H04W 72/048 370/331 |
| 2016/0242059 A1* | 8/2016 | Lopes | H04W 24/02 |
| 2017/0078850 A1 | 3/2017 | Bostick et al. | |
| 2017/0079016 A1 | 3/2017 | Nord et al. | |
| 2017/0280436 A1* | 9/2017 | Park | H04W 72/0446 |
| 2017/0347311 A1* | 11/2017 | Iyer | H04W 4/70 |
| 2018/0220373 A1* | 8/2018 | Arzelier | H04W 4/027 |
| 2020/0136708 A1* | 4/2020 | Pan | H04B 7/0617 |
| 2020/0163074 A1* | 5/2020 | Tang | H04W 16/28 |
| 2020/0213992 A1* | 7/2020 | Hoffmann | H04L 5/0037 |
| 2020/0245376 A1* | 7/2020 | Cao | H04W 72/042 |
| 2020/0322994 A1* | 10/2020 | Tian | H04W 76/27 |

OTHER PUBLICATIONS

Unknown, Author, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.3.0, Jun. 2017, pp. 1-213.

Unknown, Author, "3rd Generation Partnership Project; Technical Specification Group Radio Access Network; Evolved Universal Terrestrial Radio Access Network (E-Utran); S1 Application Protocol (S1AP) (Release 14)", 3GPP TS 36.413 V14.3.0, Jun. 2017, pp. 1-144.

Unknown, Author, "New WID on Even further enhanced MTC for LTE", 3GPP TSG RAN Meeting #75; RP-170732; Dubrovnik, Croatia, Mar. 6-9, 2017, pp. 1-4.

Unknown, Author, "Revised WID on Further NB-IoT enhancements", 3GPP TSG RAN Meeting #76; RP-171428; West Palm Beach, USA, Jun. 5-8, 2017, pp. 1-5.

Wang, Eric, et al., "A Primer on 3GPP Narrowband Internet of Things", Internet of Things; IEEE Communications magazine, Mar. 2017, pp. 117-123.

* cited by examiner

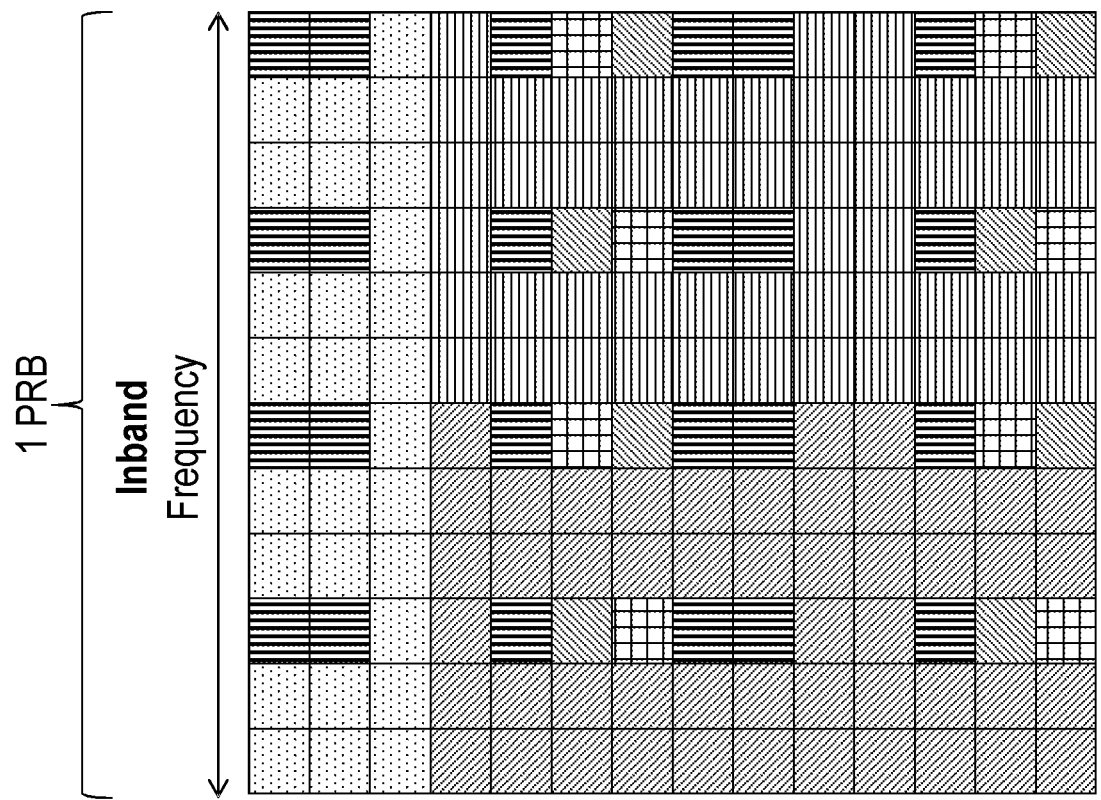
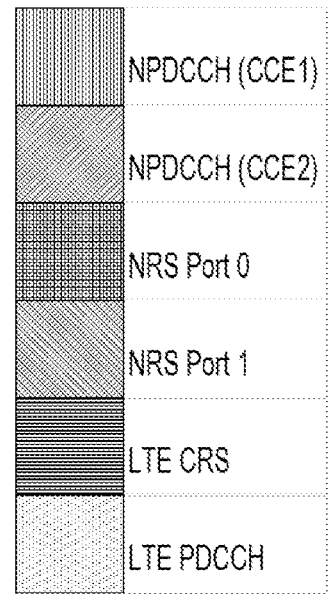
Fig. 1

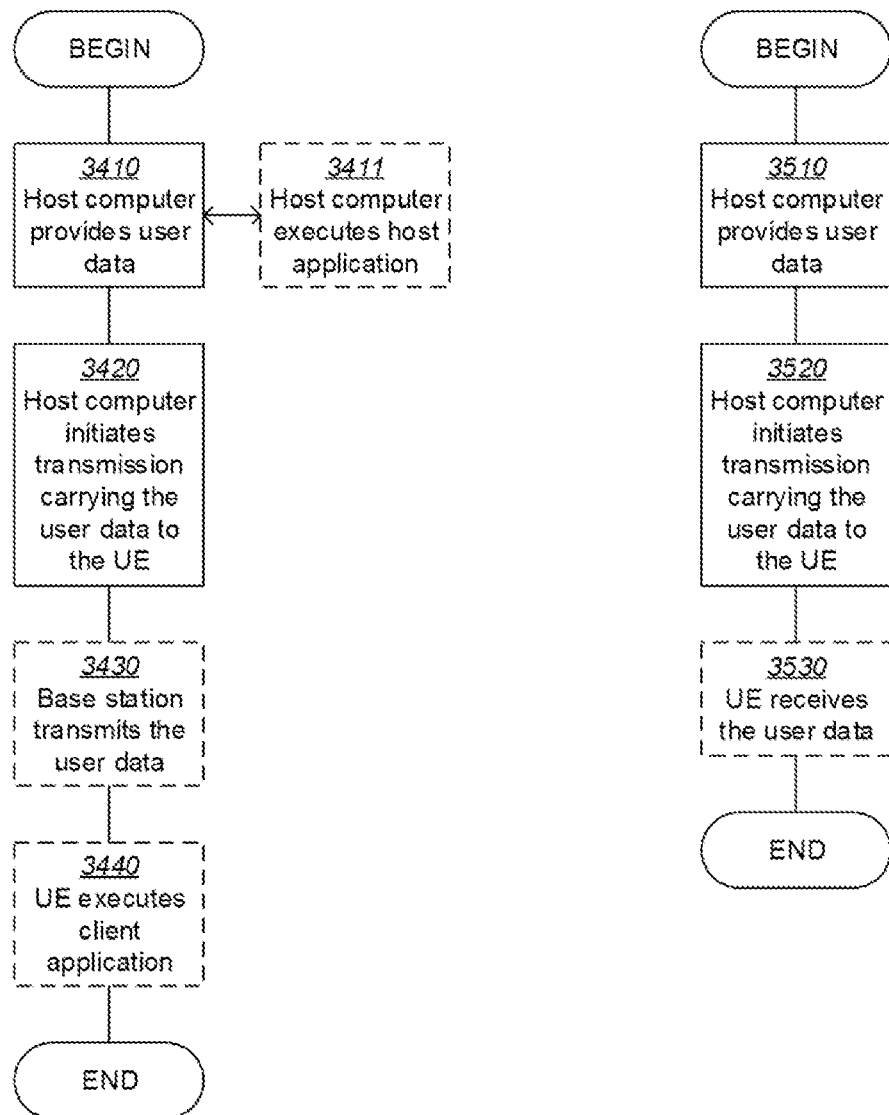

NETWORK NODE AND METHOD IN A WIRELESS COMMUNICATIONS NETWORK

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a W-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

3GPP Release-13 defines a new Radio Access technology, named Narrow Band-Internet of things (NB-IoT). NB-IoT is primarily defined for low-throughput, delay-tolerant applications, such as meters and sensors. It enables data rate of just 10's of kbps with 180 kHz of bandwidth, and can provide deep coverage. NB-IoT may be deployed within an existing LTE band, in guard-band between two regular LTE carriers, or in standalone mode, which provides an easy migration path for the re-farmed GSM, 2:nd generation/General Packet Radio Services (2G/GPRS) spectrum.

NB-IoT technology occupies a frequency band of 180 kHz bandwidth, which corresponds to one resource block in LTE transmission. Due to the reduced channel bandwidth, most physical channels have been redesigned such as: Narrowband Primary Synchronization Signal and/or Narrowband Secondary Synchronization Signal (NPSS/NSSS), Narrowband Physical Broadcast Channel (NPBCH), Narrowband Reference Signal (NRS), Narrowband Physical Downlink Control Channel (NPDCCH). See example of an NB-IoT Physical Resource Block (PRB) in FIG. 1. Wherein the x axis represents time, and the Y axis represents Inband frequency, and wherein NPDCCH (CCE1) is marked by vertical stripes, wherein CC1 is the Control Channel Elements.

NPDCCH (CCE2) is marked by to the right tilted diagonal stripes, wherein CC2 is the Control Channel Elements.

NRS Port 0 is marked by squares,

NRS Port 1 is marked by to the left tilted diagonal stripes,

LTE Cell Specific Reference Signal (CRS) is marked by horizontal stripes, and

LTE Physical Downlink Control Channel (PDCCH) is marked by dots.

Different coverage extension levels have been defined to cope with different radio conditions. There are typically 3 Coverage Enhancement (CE) levels, CE level 0 to CE level 2. CE level 0 corresponds to normal coverage, CE level 1 and 2 corresponds to extended coverage regions. CE level 2 is the furthest extended coverage, where the coverage is assumed to be very poor. The main impact of the different CE levels is that the messages have to be repeated several times especially for the CE 2, see RP-170732, "New WI on Further NB-IoT enhancements", RAN #75.

Some of the use cases that NB-IoT aims are:

Smart metering (electricity, gas and water)

Intruder alarms & fire alarms for homes & commercial properties

Smart city infrastructure such as street lamps or dustbins

Connected industrial appliances such as welding machines or air compressors.

SUMMARY

As a part of developing embodiments herein a problem will first be identified and discussed.

From the above use cases, it is evident that in most of the use cases, a majority of the UEs are going to be stationary, e.g., mounted into wall, or semi-stationary (e.g., sensors on the windows to determine when to open and close the windows). Release-15 enhancement work item of NB-IoT has introduced relaxed monitoring primarily attempted to save power consumption of the stationary or semi-stationary UEs with fixed geo-stationary position. Thus, 3gpp standardization work is ongoing to optimize the performance of NB-IoT for the UE which are fixed and not moving.

Due to limited bandwidth of a NB-IoT carrier, i.e., 180 kHz, the resource availability is limited. Further, the requirement that the radio signal should reach meters/sensors located deep in the basement etc. puts additional constraint on the resource as data needs to be repeated several number of times.

In such cases, a smart solution is needed to manage the efficient utilization of limited available resource. If a communications Network (NW) e.g. a network node such as an access point or a Mobility Management Entity (MME) can identify how much resources that will be needed and e.g. the priority of traffic type, it can prepare well and present a well-defined radio resource management scheme. Besides, the NW such as a network node can co-ordinate the data scheduling of such devices based upon the requirements.

Thus, the problem with current solution is that the NW is not aware in prior, how much resources that is needed, hence it cannot perform resource planning in advance.

An object of embodiments herein is therefore to improve the performance of a wireless communications network such as e.g. NB IoT, enhanced Machine-Type Communication (eMTC), carrier or Long Term Evolution category M1 (Cat-M).

According to a first aspect of embodiments herein, the object is achieved by a method performed by a network node, for planning radio resources for transmissions.

The network node establishes that a wireless device is fixed, wherein fixed comprises always being served by the same one or more access points.

The network node obtains a configuration comprising an identity of the wireless device and associated parameters to be used for transmissions between the network node and the wireless device. The parameters comprise an identity of the one or more access points serving the wireless device. The parameters further comprise any one or more out of: Time and periodicity, for transmissions between the network node and the wireless device.

Based on the configuration, such as the available information in the configuration, the network node plans radio resources available in the network node for upcoming transmissions between the network node and any wireless device.

According to a second aspect of embodiments herein, the object is achieved by a network node for planning radio resources for transmissions. The network node is configured to:

Establish that a wireless device is fixed, wherein fixed comprises always being served by the same one or more access points.

Obtain a configuration, which configuration comprises an identity of the wireless device and associated parameters to be used for transmissions between the network node and the wireless device. The parameters comprise an identity of the one or more access points serving the wireless device. The parameters further comprise any one or more out of: time and periodicity for transmissions between the network node and the wireless device.

Based on the configuration, such as the available information in the configuration, plan radio resources available in the network node for upcoming transmissions between the network node and any wireless device.

BRIEF DESCRIPTION OF THE DRAWINGS

Examples of embodiments herein are described in more detail with reference to attached drawings in which:

FIG. 1 is a schematic diagram illustrating prior art.

FIGS. 10 to 13 are flowcharts illustrating methods implemented in a communication system including a host computer, a base station and a user equipment.

DETAILED DESCRIPTION

Figure 2:
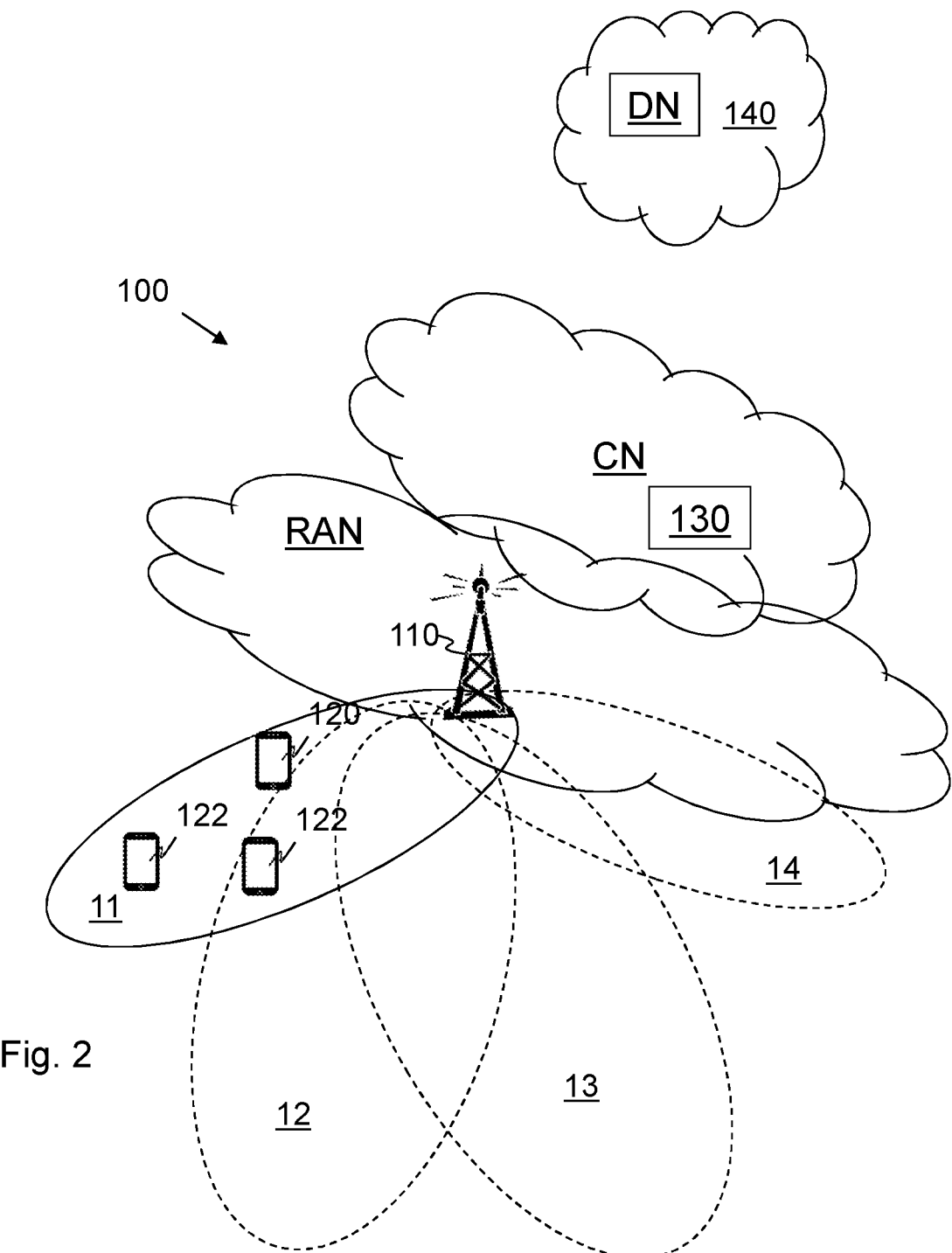
FIG. 2 is a schematic block diagram illustrating embodiments of a wireless communications network.

Embodiments herein relate to wireless communication networks in general. FIG. 2 is a schematic overview depicting a wireless communications network 100 wherein embodiments herein may be implemented. The wireless communications network 100 comprises one or more RANs and one or more CNs. The wireless communications network 100 may use a number of different technologies, such as NB-IoT, CAT-M, Wi-Fi, eMTC, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

In the wireless communication network 100, wireless devices e.g. a wireless device 120 also referred to as the first UE 120, is fixed and may be comprised in a group of fixed wireless devices comprising also some other wireless devices 122 also referred to a second wireless devices 122. The term fixed wireless device when used herein means that the wireless device 120, 122 always is served by the same one or more access points such as e.g. the same one or more cells, and this is also referred to as Stationary e.g., mounted into wall, or Semi-Stationary devices e.g., sensors on the windows to determine when to open and close the windows.

The wording "served by the same one or more access points" when used herein may e.g. mean "served by at least one or more access points at the same location".

The wireless devices 120, 122 may each e.g. be a mobile station, a non-access point (non-AP) STA, a STA, a user equipment and/or a wireless terminals, an NB-IoT device, an eMTC device and a CAT-M device, a WiFi device, an LTE device and an NR device communicate via one or more Access Networks (AN), e.g. RAN, to one or more core networks (CN). It should be understood by the skilled in the art that "wireless device" is a non-limiting term which means any terminal, wireless communication terminal, user equipment, Device to Device (D2D) terminal, or node e.g. smart phone, laptop, mobile phone, sensor, relay, mobile tablets or even a small base station communicating within a cell.

Network nodes operate in the radio communications network 100, such as a network node 110 also referred to as the first network node 110, providing radio coverage over one or more geographical areas such as a service area 11, a service area 12, a service area 13, and a service area 14. These service areas may have difference CE levels, as e.g. CE level 0, CE level 1 and/or 2 mentioned above, corresponding to extended coverage regions. These may also be referred to as a beam or a beam group of a radio access technology (RAT), such as 5G, LTE, Wi-Fi, NB-IoT, CAT-M, Wi-Fi, eMTC or similar. The network node 110 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the network node 110 depending e.g. on the radio access technology and terminology used. The network node 110 may be referred to as a serving radio network node and communicates with the wireless device 120, 122 with Downlink (DL) transmissions to the wireless device 120, 122 and Uplink (UL) transmissions from the wireless device 120, 122.

Further network nodes operate in the radio communications network 100, such as a network node 130 also referred to as the second network node 130. The network node 130 may be an MME which is a control node for an LTE access network, a Serving Gateway (SGW), and a Packet Data Network Gateway (PGW). An MME is amongst other responsible for tracking and paging procedure including retransmissions.

Methods according to embodiments herein may be performed by any of the network node 110 such as e.g. an eNB or by the network node 130 such as e.g. an MME. Thus methods according to embodiments herein may be performed by the network node referred to as the network node 110, 130.

Methods e.g. for planning radio resources for transmissions in the wireless communications network 110, is performed by the network node 110, 130. As an alternative, a Distributed Node (DN) and functionality, e.g. comprised in a cloud 140 as shown in FIG. 2 may be used for performing or partly performing the methods.

Embodiments herein may e.g. refer to NB-IoT, Radio Resource Management, Scheduling, Random Access, Paging, and Stationary UEs.

According to embodiments herein the wireless device may e.g. be characterized by the below two properties.

a) The wireless device 120 is fixed such as e.g. Stationary or Semi-Stationary. E.g. the wireless device 120 may be served by one fixed cell, the wireless device 120 may be remaining in the same cell, or the wireless device 120 may be served by at least one or more access points at the same location.

b) The wireless device 120 uses Periodic data generation, e.g. once per every hour, once per day or once per month.

The above properties may be used as an input to a Radio Resource Management (RRM) algorithm. An RRM algorithm when used herein is primarily a resource planner which considers Quality of Service (QoS), UE Differentiation and provides input to a scheduler. A static configuration may exist in the network node 110, 130 e.g. an MME or an access point such as an eNB which e.g. will define the fixed wireless device, it's location, data generation intervals and priority etc. This configuration may be used as a guide to RRM algorithm in RAN, e.g. the network node 110 such as the eNB to plan its resources. If the configuration is done in the network node 130 such as the MME, the needed parameter may be sent via a paging message from the network node 130 such as the MME to the network node 110 such as the eNB.

Some examples herein provide a feature that may provisionally change and reserve random-access preambles, NB-IoT Physical Random Access Channel (NPRACH) and scheduling resource over different time of the day. Or an operator may coordinate with service providers to coordinate the behavior of such wireless devices 120 so that available resources can be utilized efficiently.

Advantages of embodiments herein may comprise the following:

Since the wireless device 120 is fixed the network node 130 such as an MME may use the configuration according to embodiments herein to track the wireless device 120 based upon cell Identity (Cell Id). Thus, future paging can be directed to Cell Id to minimize the paging capacity.

In some cases when certain industry/factory/hospitals supported by NB-IoT cell wants to get guaranteed performance and customized services, the configuration according to embodiments herein may be used to fulfil such requirement.

Certain pre-ambles (NPRACH resource) can be reserved or pre-allocated when it is known from the configuration according to embodiments herein that a high prioritized wireless device, e.g. the wireless device 120, is going to access the system.

Timing Advance (TA) may be one of the parameters in the configuration according to embodiments herein from the network node 110, 130 to the wireless device 120 in a random access response message, see 3gpp, 36.321v30 "Medium Access Control (MAC) protocol specification", 2017-06. For the fixed such as the stationary or semi-stationary wireless devices e.g. the wireless device 120, the network node 110, 130 such as an eNB may configure TA in advance thus reducing the processing effort required in eNB to compute the value for each random-access procedure.

Scheduling Resource (UL/DL) may be pre-allocated for prioritized user (industry valve/sensors) e.g. the wireless device 120, whose data generation periodicity is known and has been configured in the network node 110, e.g. an eNB according to embodiments herein.

The configuration according to embodiments herein may further be used to block low priority users if it knows a high priority user) e.g. the wireless device 120, is going to access the NW such as the wireless communications network 100.

Embodiments herein are mostly exemplified with NB-IoT devices but it may be applicable to other wireless devices which are served by other Radio Access technologies such as CAT-M, LTE, WiFi, or NR Carriers.

In the following, embodiments herein are illustrated by exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

It should furthermore be noted that, to anyone skilled in the art, there are several realizations of the embodiments below with principally equivalent functionality.

In addition, it should be noted that message names, parameters, information elements and field names may change during the course of the specification work which implies that embodiments described herein still apply as long as the principal function and/or use is the same.

Some exemplifying embodiments will now be described in more detail.

Actions of Some Embodiments Herein

Figure 3:
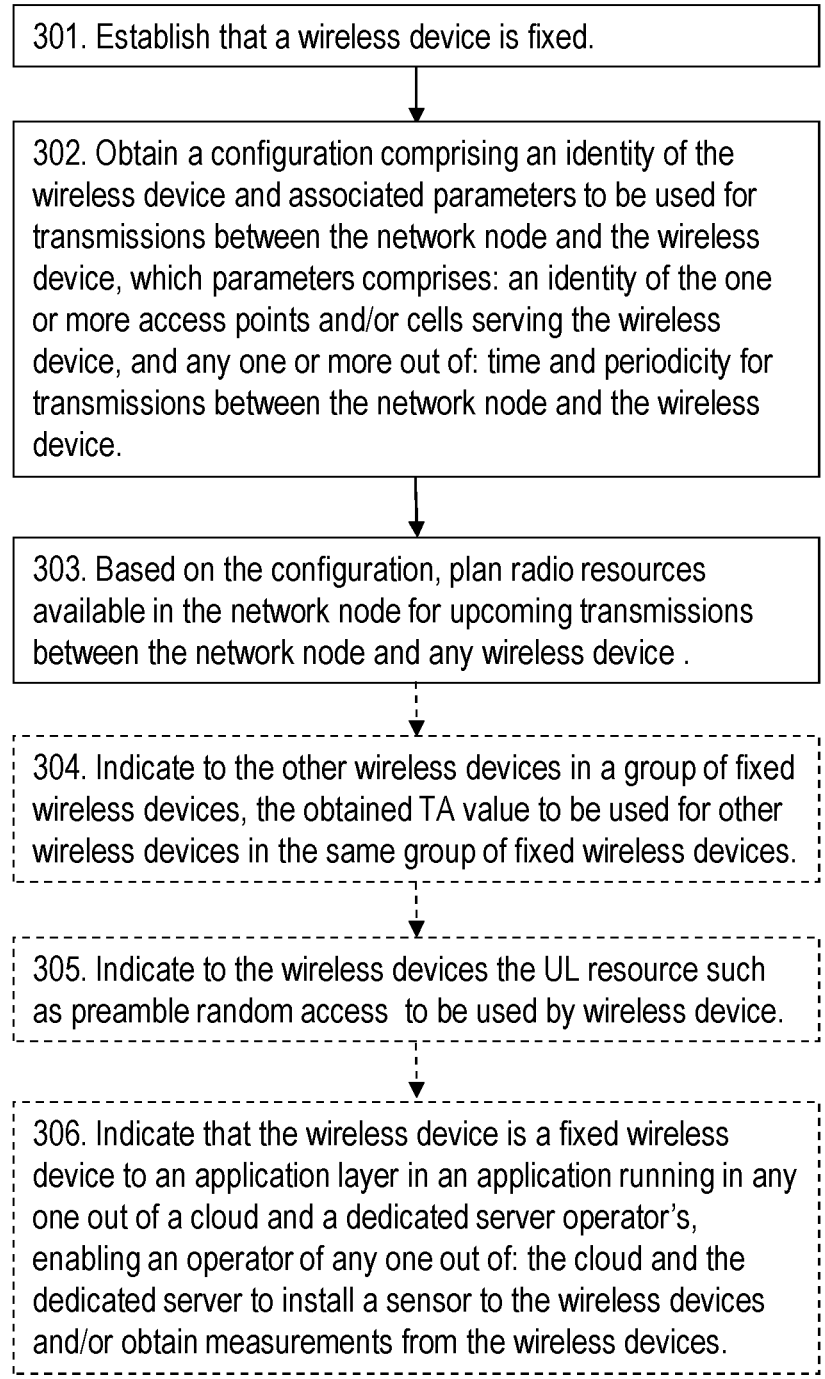
FIG. 3 is a flowchart depicting embodiments of a method in a network node.

Example embodiments of a flowchart depicting embodiments of a method performed by the network node 110, 130, e.g. for planning radio resources for transmissions, such as e.g. over an NB-IoT, an eMTC, an LTE, a WiFi, or an NR Carriers carrier is depicted in FIG. 3 and will be described more in detail in the following. The method may comprise one or more of the following actions which actions may be taken in any suitable order.

The actions will first be described in in short:

In action 301, the network node 110, 130 establishes that a wireless device 120 is fixed. Being fixed means to always be served by the same one or more access points such as e.g. the same one or more cells.

In action 302, the network node 110, 130 obtains a configuration. The configuration comprises an identity of the wireless device 120 and associated parameters to be used for transmissions between the network node 110 and the wireless device 120. The parameters comprises: an identity of the one or more access points and/or cells serving the wireless device 120, and any one or more out of: time and periodicity for transmissions between the network node 110 and the wireless device 120.

In action 303, based on the configuration, the network node 110, 130 may plan radio resources available in the network node 110 for upcoming transmissions between the network node 110 and any wireless device 120, 122 e.g. over the NB-IoT carrier, the eMTC carrier or the Cat-M, carrier, LTE, WiFi, or NR Carriers.

Action 301

The network node 110, 130 establishes that a wireless device 120 is fixed, wherein fixed comprises always being served by the same one or more access points, such as e.g. the same one or more cells or by at least one or more access points at the same location.

In some embodiments, the establishing that the wireless device 120 is fixed, further comprises establishing that the wireless device 120 is any one or more out of: an NB-IoT device, an eMTC device and a CAT-M device, a WiFi device, an LTE device and an NR device.

Action 302

The network node 110, 130 obtains a configuration. The configuration comprises an identity of the wireless device 120 and associated parameters to be used for transmissions between the network node 110, 130 and the wireless device 120. The parameters comprise an identity of the one or more access points serving the wireless device 120. The parameters furthermore comprise any one or more out of: time and periodicity, for transmissions between the network node 110, 130 and the wireless device 120.

The parameters may further comprise any one or more out of: Timing Advance, TA, value, quality of service, priority, and dedicated resource need.

In some embodiments, the wireless device 120 is comprised in a group of fixed wireless devices 120, 122, and the parameters further comprises an identity of the group of fixed wireless devices 120, 122.

In some of these embodiments, the TA value may be obtained by measuring an UL transmission of the wireless device 120 in the group of fixed wireless devices 120, 122. Furthermore, the TA value may apply to all the wireless devices in the group of fixed wireless devices 120, 122, e.g. without repeating the measurements for each individual wireless device in the group of fixed wireless devices 120, 122.

As an alternative in these embodiments, the TA value may be obtained from any one wireless device in the group of fixed wireless devices 120, 122. In these embodiments, the TA value may be based on an accurate geographical position of the wireless device 120 mapped to a TA value broadcasted in System Information, SI.

Action 303

Based on the configuration, such as the available information in the configuration the network node 110, 130, plans radio resources available in the network node 110, 130 for upcoming transmissions between the network node 110, 130 and any wireless device 120, 122, e.g. over the NB-IoT carrier, the eMTC carrier or the Cat-M, carrier, LTE, WiFi, or NR Carriers.

In some embodiments, the planning of the radio resources available in the network node 110, 130 may comprise optimizing resource consumption for any one or more out of: random access, scheduling of user data, and paging messages. E.g. such as pre-allocating radio resources consumption for any one or more out of: random access, scheduling of user data, and further minimizing paging messages overheads.

Action 304

In some embodiments, the network node 110, 130 indicates to the other wireless devices 120, 122 in the group of fixed wireless devices 120, 122, the obtained TA value to be used for other wireless devices 120, 122 in the same group of fixed wireless devices 120, 122.

Action 305

In some embodiments, the network node 110, 130 indicates to the wireless device 120, 122 the Uplink resource such as preamble random access (NPRACH Preamble) to be used by the wireless device 120, 122.

Action 306

In some embodiments, the network node 110, 130 indicates that the wireless device 120 is a fixed wireless device to an application layer. The application layer may be in an application running in any one out of: a cloud 140 and a dedicated server operator's, enabling an operator of any one out of: the cloud 140 and the dedicated server to install a sensor to the wireless devices 120 and/or obtain measurements from the wireless devices 120.

Figure 4:
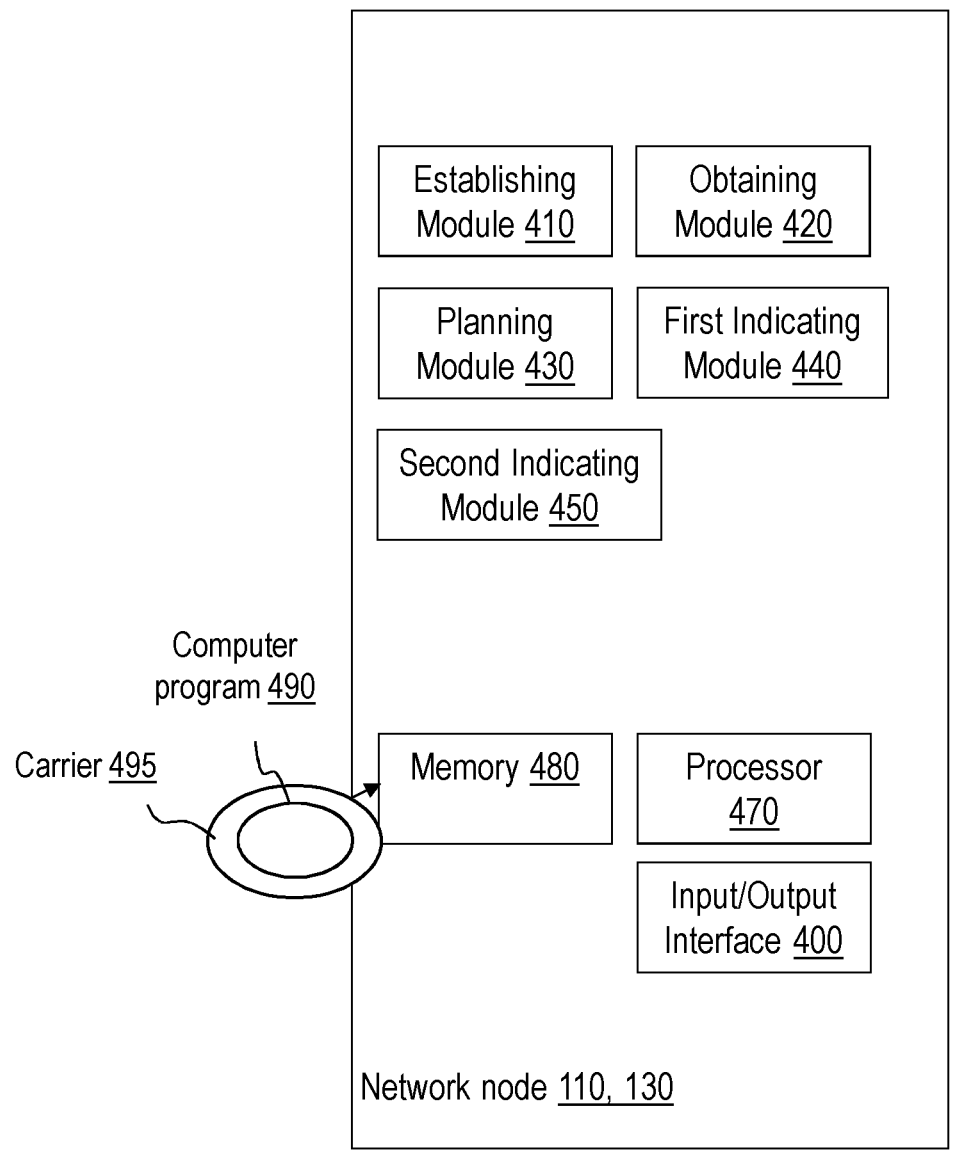
FIG. 4 is a schematic block diagram illustrating embodiments of a network node.

To perform the method actions e.g. for planning radio resources for transmissions, the network node 110, 130 may comprise the arrangement depicted in FIG. 4. The network node 110, 130 may e.g. comprise an establishing module, an obtaining module and a planning module. The network node 110, 130 may further comprise a first indicating module 440 and a second indicating module 450.

Those skilled in the art will also appreciate that the modules in the network node, 110, 130, described above may refer to a combination of analog and digital circuits, and/or one or more processors configured with software and/or firmware, e.g. stored in the network node, 110, 130, that when executed by the respective one or more processors such as the processors described above. One or more of these processors, as well as the other digital hardware, may be included in a single Application-Specific Integrated Circuitry ASIC), or several processors and various digital hardware may be distributed among several separate components, whether individually packaged or assembled into a system-on-a-chip SoC).

The network node 110, 130 may comprise an input and output interface configured to communicate with the wireless device 120, 122. The input and output interface may comprise a wireless receiver not shown) and a wireless transmitter not shown).

The embodiments herein may be implemented through a respective processor or one or more processors, such as the processor of a processing circuitry in network node 110, 130 depicted in FIG. 4, together with respective computer program code for performing the functions and actions of the embodiments herein. The program code mentioned above may also be provided as a computer program product, for instance in the form of a data carrier carrying computer program code for performing the embodiments herein when being loaded into the network node 110, 130. One such carrier may be in the form of a CD ROM disc. It is however feasible with other data carriers such as a memory stick. The computer program code may furthermore be provided as pure program code on a server and downloaded to the network node 110, 130.

The network node 110, 130 may further comprise a memory comprising one or more memory units. The memory comprises instructions executable by the processor in the network node 110, 130.

The memory is arranged to be used to store e.g. data, configurations, and applications to perform the methods herein when being executed in the network node 110, 130.

In some embodiments, a respective computer program comprises instructions, which when executed by the respective at least one processor, cause the at least one processor of the network node 110, 130 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

For the fixed wireless device 120 such as e.g. a stationary and/or semi-stationary NB-IoT device that sends data periodically, e.g. once every hour, day, week etc. it is possible to preconfigure a set of parameters that may be utilized to optimize the resource consumption in the network node 110, 130 such as e.g. the eNB once the wireless device 120 becomes active.

The table below lists a few parameters that may be configured for the fixed wireless device 120. It also provides some examples of how the parameters may be set.

wireless device such as the wireless device 120. A static configuration which e.g. will define the fixed wireless device 120, it's location, data generation intervals and priority etc may be stored, or the data in the configuration may be updated dynamically based on the behavior of the wireless device 120 using machine learning algorithms or other input.

If the information is stored in the network node 130 such as the MME, relevant parameters may be sent to the network node 110 eNB in a S1-AP Paging message [4], or in a S1-AP Initial Context Setup Request message, see 3GPP, 36.413v30 "S1 Application Protocol", 2017-06. For this purpose, the S1-AP messages may be extended with new IEs, for example TA of the wireless device 120, the Stationary/Semi-stationary group the wireless device 120 belongs to, Priority of the wireless device 120 etc.

If the information is stored in the network node 110 such as e.g. the eNB it shall preferably be associated with an identity of the wireless device 120, e.g. IMSI. At reception of a S1-AP Paging message containing the IMSI the network node 110 is then able to retrieve the wireless device 120 specific configuration associated with this IMSI.

The configuration data above may be used by first network node 110 and the second network node 130 such as e.g. the eNB or MME to optimize resource consumption for random access (A), scheduling of user-data (B) paging (C) and D) Usage of NB-IoT Fixed Devices for different purposes as described in more details below.

A) Random Access Procedure

The TA value in the configuration according to embodiments herein may be obtained from measuring the UL transmission of one wireless device, e.g. the wireless device 120, in the group of fixed wireless devices 120, 122. The TA value may then be applied to all the wireless devices in this group without repeating the measurements for each individual wireless device.

In one of the embodiments, the TA may be estimated without UL transmission. In this embodiment, this is performed by using accurate positioning e.g. using Global Positioning System (GPS), Observed Time Difference of Arrival (OTDOA) etc. the wireless device 120 may map its position to a TA value Ra using a mapping of geographical position to TA broadcasted in SI (System Information) and thus estimate its TA without any UL transmission. The wireless device 120 may then send this estimated TA to the network node 110, 130.

| Parameter | Stationary or semi-stationary UE ID | Group of stationary or semi-stationary UE (Note) | Location(TA) Stored in Timing Advance unit | Location (cell) | QoS/Priority (1 to 10) | Time and/or Periodicity of Data | Dedicated Resource need DL/UL (low 5 SF, medium 10 SF, high 20 SF) |
|---|---|---|---|---|---|---|---|
| Value (example) | IMSI | Stationary group 3 | 500 ms | Cell xx | 1 | 10:00AM and then every 1 hour | High/Low |

Note that this may be a group of UEs having the same geographical position. The group of UEs may e.g. comprise the wireless device 120.

The configuration according to embodiments herein may be stored in the network node 110, 130 such as e.g. in the MME and/or in the eNB serving the wireless device 120, per In one of the embodiments the network node 110, 130 such as the eNB may use the configured TA to improve the estimation of TA during Random Access (RA) procedure and the configured updated value may be re-used for subsequent random access procedure until certain duration/count:

Machine learning based estimation techniques may be used by the network node 110, 130 to keep an updated value of the configured TA. New configured value may take into account the old configured value and derived value from RA procedure.

New configured value=(old configured value, estimated value from RA procedure).

Only when there is synchronization issue or after certain time and/or count has elapsed, the network node 110, 130 such as the eNB may evaluate TA otherwise it would rely upon the configured value, thus saving the network node 110, 130 such as eNB processing capacity.

In one example, the network node 110, 130 such as the eNB may obtain the TA value according to embodiments herein as described above, from any wireless device in the same group of stationary or semi-stationary the wireless devices 120, 122 and indicate the estimated TA value to be used for other wireless devices 120, 122 in the same group e.g. via paging, SI, or dedicated signaling. This is an advantage since the network node 110, 130 does not need to compute TA for each wireless devices 120, 122. However, the network node 110, 130 may apply approximation algorithms and estimation techniques to further fine tune the TA.

In one of the embodiments, the network node 110, 130 such as the eNB sends out information to a group of stationary or semi-stationary wireless devices 120, 122 e.g. by using a paging or similar mechanism, specifying the TA values and random-access resources such as pre-ambles to use for the random access procedure. This is an advantage since it allows guaranteed service without any contention and provides the mechanism for the UL packets to be in sync.

In one of the embodiments, the network node 110, 130 such as the eNB may send out information to a group of stationary or semi-stationary wireless devices 120, 122 specifying the TA values obtained from the configuration or previous estimation according to embodiments herein, and the random-access resources to use for the random access procedure. Applying previous TA or configured TA will avoid performing complex TA computation. Further, the knowledge about which random-access preamble to use will provide contention free random-access procedure.

In one of the embodiments the network node 110, 130 such as the eNB may indicate either via paging, SI or dedicated signals to the wireless devices 120, 122 that the previous used TA value according to embodiments herein is still valid. This is beneficial as TA value calculation can be avoided.

Figure 5:
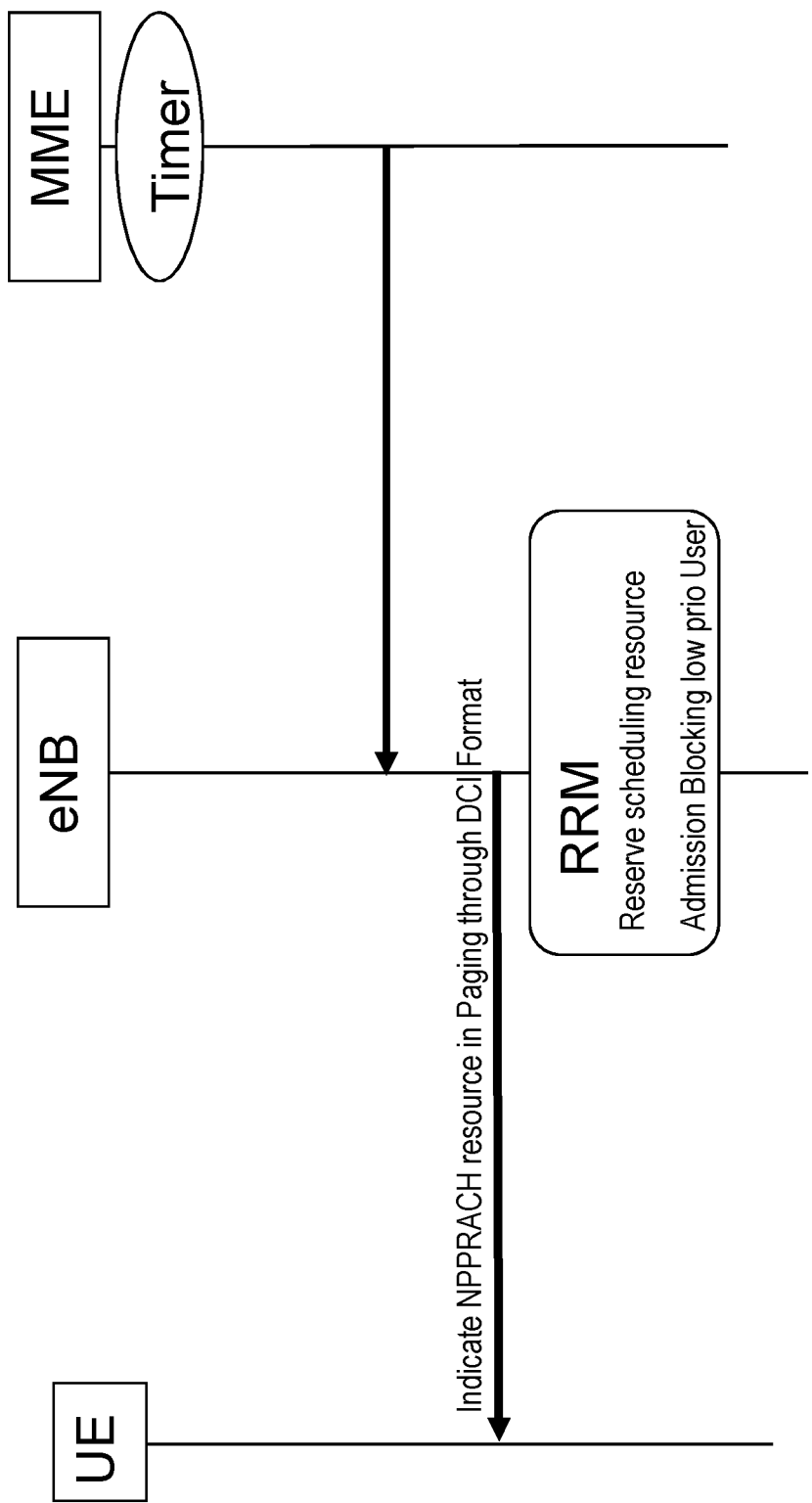
FIG. 5 is a signaling diagram illustrating embodiments herein.

In one of the embodiments, the network node 110, 130 such as the eNB may indicate either via paging, SI or dedicated signals to the wireless devices 120, 122 that the previous random access resource (NPRACH Preambles) is still valid and can be used. This is helpful as it allows guaranteed service without any contention In one of the embodiments, the network node 110, 130 such as the MME pages the wireless device 120 just before it is expected to initiate a random access triggered by UL data. This is to page the wireless device 120 so that UL Random access procedure can be contention-free. In the RRC Paging message the network node 110, 130 such as the eNB may indicate in NPRACH Resource according to embodiments herein, that the wireless device 120 may use, e.g. through the use of new DCI format. NPRACH resource may be pre-allocated and signaled to the wireless device 120 as shown in FIG. 5. See RRC Paging message below from 3GPP, 36.331v30 "Radio Resource Control", 2017-06.

Figure 6:
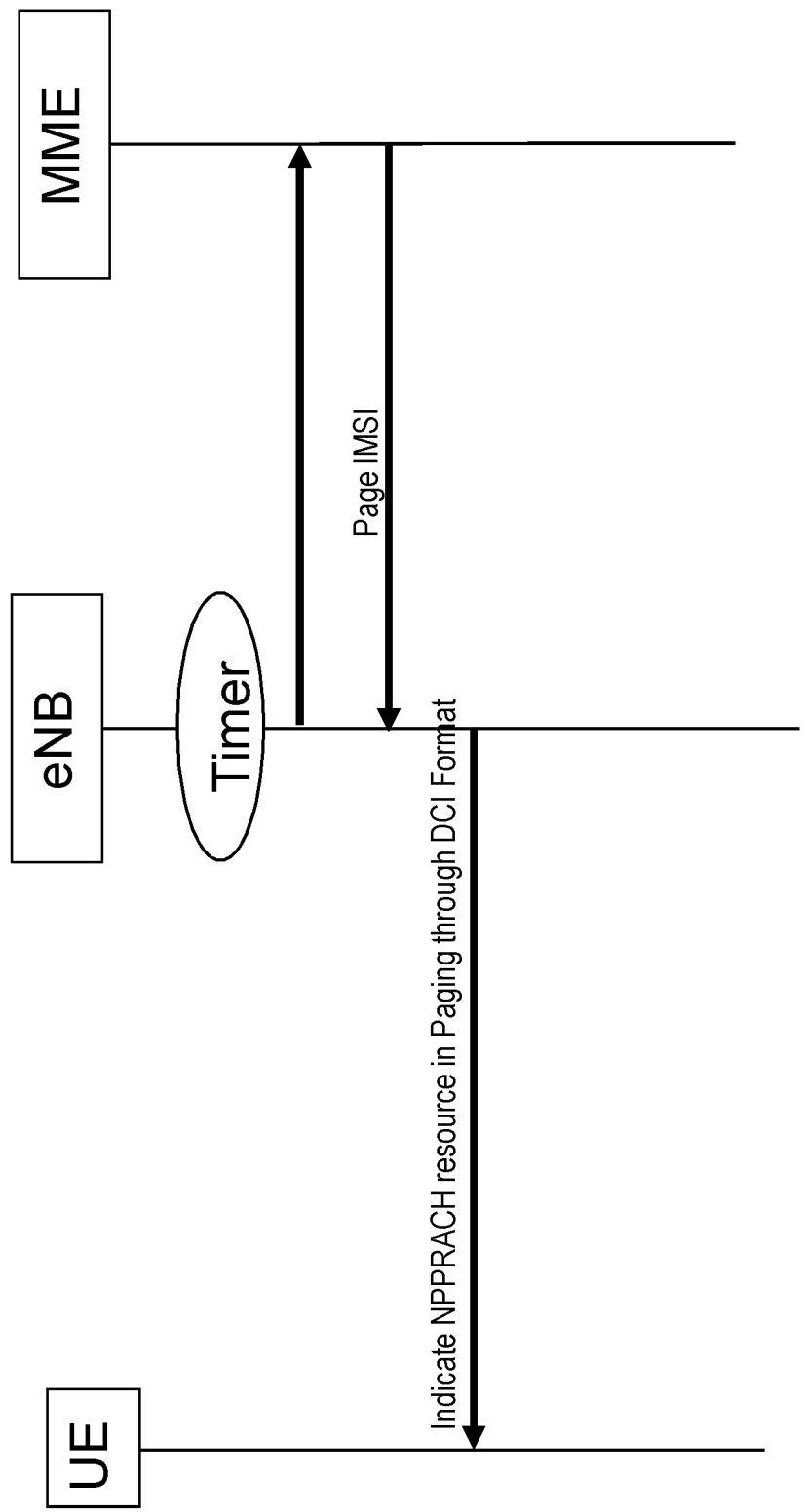
FIG. 6 is a signaling diagram illustrating embodiments herein.

In one of the embodiments, the network node 110 such as the eNB requests the network node 130 such as the MME to page the wireless device 120 just before it is expected to initiate a random access triggered by UL data. In the RRC Paging message, the network node 110, 130 such as the eNB may indicate NPRACH Resource that the wireless device 120 may use, through the use of new DCI format. NPRACH resource may be pre-allocated and signaled to the wireless device 120 as shown in FIG. 6 and the RRC Paging message below from 3GPP, 36.331v30 "Radio Resource Control", 2017-06.

---

From 3GPP, 36.331v30 "Radio Resource Control ", 2017-06:
5.1.1.1                    Paging
The Paging message is used for the notification of one or more UEs.

Signalling radio bearer: N/A
RLC-SAP: TM
Logical channel: PCCH
Direction: E UTRAN to UE Paging message
-- ASN1START
Paging ::=                    SEQUENCE {
    pagingRecordList              PagingRecordList        OPTIONAL,  -- Need ON
    systemInfoModification        ENUMERATED {true}       OPTIONAL,  -- Need ON
    etws-Indication               ENUMERATED {true}       OPTIONAL,  -- Need ON
    nonCriticalExtension          Paging-v890-IEs         OPTIONAL
}
Paging-v890-IEs ::=           SEQUENCE {
    lateNonCriticalExtension      OCTET STRING            OPTIONAL,
    nonCriticalExtension          Paging-v920-IEs         OPTIONAL
}
Paging-v920-IEs ::=           SEQUENCE {
    cmas-Indication-r9            ENUMERATED {true}       OPTIONAL,  -- Need ON
    nonCriticalExtension          Paging-v1130-IEs        OPTIONAL
}

-continued

```
Paging-v1130-IEs ::=              SEQUENCE {
    eab-ParamModification-r11         ENUMERATED {true}    OPTIONAL,  -- Need
ON
    nonCriticalExtension              Paging-v1310-IEs     OPTIONAL
}
Paging-v1310-IEs =                SEQUENCE {
    redistributionIndication-r13      ENUMERATED {true}    OPTIONAL,  --Need
ON
    systemInfoModification-eDRX-r13   ENUMERATED {true}    OPTIONAL,  -- Need
ON
    nonCriticalExtension              SEQUENCE { }         OPTIONAL
}
Paging-vxy-IEs ::=                SEQUENCE {
    allocatePreamble                  ENUMERATED {true}    OPTIONAL,  -- Need
ON
    nonCriticalExtension              SEQUENCE { }         OPTIONAL
}
PagingRecordList ::=              SEQUENCE (SIZE (1..maxPageRec)) OF
                                  PagingRecord
PagingRecord ::=                  SEQUENCE {
    ue-Identity                       PagingUE-Identity,
    cn-Domain                         ENUMERATED {ps, cs} ,
    ...
}
PagingUE-Identity ::=             CHOICE {
    s-TMSI                            S-TMSI,
    imsi                              IMSI,
    ...
}
IMSI ::=                          SEQUENCE (SIZE (6..21)) OF IMSI-Digit
```

Figure 7:
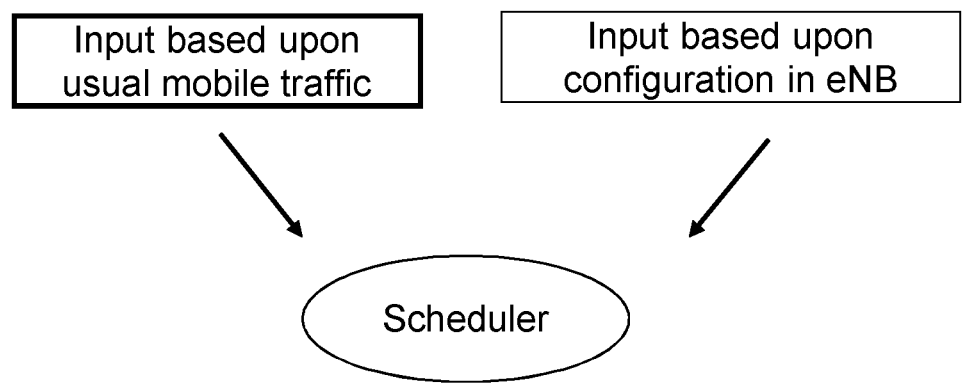
FIG. 7 is a schematic block diagram illustrating embodiments.

B) Scheduling Resource:

The network node 110, 130 such as the eNB in above case may deduce DL resource needed based upon TA, number of repetitions needed and dedicated resource need mentioned in the configuration and thus pre-allocate resource for the wireless device 120 122. Similar resource allocation may be done in UL as well. See FIG. 7. The network node 110, 130 may use input based on usual mobile traffic together with input from the configuration according to embodiments herein to pre-allocate resource for the wireless device 120, 122.

E.g. the network node 110, 130 co-ordinates the UL/DL data scheduling of the wireless device 120, 122 such as NB-IoT devices and configures it in the network node 110, 130 such as the eNB with the priority, TA, periodicity of data and resource needs.

The network node 110, 130 may use the configured parameters as an input to RRM algorithms such as NPRACH resource allocation, Admission (Blocking of low priority user) and scheduling resources.

C) Paging Improvements

In one of the embodiments, the network node 130 such as the MME may page the stationary UE such as the wireless device 120 to its last known cell to reduce the paging load. There is then no need to page to the complete Tracking Area.

D) Usage of NB-IoT Fixed Devices for Different Purposes

In some of the embodiments, the network node 110, 130 may indicate that the wireless device 120 is a stationary or semi-stationary device to an application layer in applications such as e-health, smart city etc. running in the cloud 140 or dedicated servers. The application may take benefits of this information that the wireless device 120 is stationary. When fixed wireless devices, such as the wireless device 120, are installed and consent from an operator is available, the network node 110 may broadcast such information about the wireless device 120 being stationary, to various cloud applications; for instance to a smart city server. A smart city server when used herein means a server that contains information by collecting electronic data sensors measurements that may be used to manage assets and resources efficiently. Thus, owners of Smart city servers upon consent from operator may install a sensor to such fixed wireless devices which can for instance report periodic air pollution and daily temperature.

Many NB-IoT use cases involves geographically fixed UEs such as the wireless device 120, 122 and shall be served by the same cell(s). According to embodiments herein, these characteristics are capitalized on resulting in simplified complex UE/RAN procedures.

A feature that allows to prioritize certain configured NB-IoT devices such as the wireless device 120, especially industry or factory served by the network node 110, such as an NB-IoT cell in order to provide them better service and enable efficient resource planning for the network node 110 such as the eNB. The eNB may provisionally change and reserve the NPRACH and scheduling resource over different time of the day. Or an operator may coordinate with the service providers to coordinate the behavior of such devices. This is an advantage since load balancing may be done by handling some of the traffic only during the less busy period also referred to as non-peak hours.

Some example Embodiments numbered 1-14 are described below. The following embodiments refer among other things to FIG. 2, FIG. 3 and FIG. 4.

Embodiment 1

A method performed by a network node, 110, 130 e.g. for planning radio resources for transmissions, e.g. over a Narrow Band-Internet of Things, NB-IoT, carrier, enhanced Machine-Type Communication, eMTC, carrier or Long Term Evolution category M1, Cat-M, carrier, the method comprising:

establishing 301 that a wireless device 120 is fixed, wherein fixed comprises always being served by the same one or more access points such as e.g. the same one or more cells, obtaining 302 a configuration, which configuration comprises an identity of the wireless device 120 and associated parameters to be used for transmissions between the network node 110 and the wireless device 120, which parameters comprises: an identity of the one or more access points and/or cells serving the wireless device 120, and any one or more out of: time and periodicity for transmissions between the network node 110 and the wireless device 120, based on the configuration, planning 303 radio resources available in the network node 110 for upcoming transmissions between the network node 110 and any wireless device 120, 122 e.g. over the NB-IoT carrier, the eMTC carrier or the Cat-M, carrier.

Embodiment 2

The method according to embodiment 1, wherein the parameters further comprises any one or more out of: location of the wireless device 120 TA such as TA value, quality of service, priority, and dedicated resource need.

Embodiment 3

The method according to any of the embodiments 1-2, wherein the wireless device is comprised in a group of fixed wireless devices 120, 122, and wherein the parameters further comprises an identity of the group of fixed wireless devices 120, 122.

Embodiment 4

The method according to embodiment 3, wherein the TA value is obtained by measuring an UL transmission of the wireless device 120 in the group of fixed wireless devices 120, 122, and applied to all the wireless devices in the group of fixed wireless devices 120, 122 e.g. without repeating the measurements for each individual wireless device in the group of fixed wireless devices 120, 122.

Embodiment 5

The method according to any of the embodiments 1-4, wherein planning 303 radio resources available in the network node 110 comprises: optimizing resource consumption for any one or more out of: random access, scheduling of user data, and paging messages.

Embodiment 6

The method according to any of the embodiments 1-5, wherein establishing 301 that the wireless device 120 is fixed, further comprises establishing that the wireless device 120 is any one or more out of: an NB-IoT device, an eMTC device and a CAT-M device, a WiFi device, an LTE device and an NR device.

Embodiment 7

A computer program comprising instructions, which when executed by a processor, causes the processor to perform actions according to any of the claims 1-6.

Embodiment 8

A carrier comprising the computer program of embodiment 7, wherein the carrier is one of an electronic signal, an optical signal, an electromagnetic signal, a magnetic signal, an electric signal, a radio signal, a microwave signal, or a computer-readable storage medium.

Embodiment 9

A network node, 110, 130 e.g. for planning radio resources for transmissions, e.g. over a Narrow Band-Internet of Things, NB-IoT, carrier, enhanced Machine-Type Communication, eMTC, carrier or Long Term Evolution category M1, Cat-M, carrier, the network node, 110, 130 being configured to:

establish that a wireless device 120 is fixed, wherein fixed comprises always being served by the same one or more access points such as e.g. the same one or more cells, e.g. by means of an establishing module 410 in the network node, 110, 130, obtain a configuration, which configuration comprises an identity of the wireless device 120 and associated parameters to be used for transmissions between the network node 110 and the wireless device 120, which parameters comprises: an identity of the one or more access points and/or cells serving the wireless device 120, and any one or more out of: time and periodicity for transmissions between the network node 110 and the wireless device 120, e.g. by means of an obtaining module 420 in the network node, 110, 130, based on the configuration, plan radio resources available in the network node 110 for upcoming transmissions between the network node 110 and any wireless device 120, 122 e.g. over the NB-IoT carrier, the eMTC carrier or the Cat-M, carrier, e.g. by means of a planning module 430 in the network node, 110, 130.

Embodiment 10

The network node, 110, 130 according to embodiment 9, wherein the parameters further is adapted to comprise any one or more out of:

timing advance, TA, value, quality of service, priority, and dedicated resource need.

Embodiment 11

The network node, 110, 130 according to any of the embodiments 9-10, wherein the wireless device is adapted to be comprised in a group of fixed wireless devices 120, 122, and wherein the parameters further comprises an identity of the group of fixed wireless devices 120, 122.

Embodiment 12

The network node, 110, 130 according to embodiment 11, wherein the TA value is adapted to be obtained by measuring an UL transmission of the wireless device 120 in the group of fixed wireless devices 120, 122, and adapted to be applied the TA value to all the wireless devices in the group of fixed wireless devices 120, 122 e.g. without repeating the measurements for each individual wireless device in the group of fixed wireless devices 120, 122.

Embodiment 13

The network node, 110, 130 according to any of the embodiments 9-12, wherein the network node, 110, 130 further is configured to: planning 203 radio resources available in the network node 110 comprises optimizing resource consumption for any one or more out of: random access, scheduling of user data, and paging messages, e.g. by means of the planning module in the network node, 110, 130.

Embodiment 14

The network node, 110, 130 according to any of the embodiments 9-13, wherein the network node, 110, 130 further is configured to: establish that the wireless device 120 is any one or more out of: an NB-IoT device, an eMTC device and a CAT-M device, a WiFi device, an LTE device and an NR device.

5. The network node, 110, 130 according to claim 14, wherein the TA value is adapted to be obtained from the wireless device 120, which TA value is adapted to be based on an accurate geographical position of the wireless device 120 mapped to a TA value broadcasted in System Information, SI. [page 11, lines 13-17 in provisional]

6. The network node, 110, 130 according to claim 16, further being configured to:

indicate to the other wireless devices 120, 122 in the group of fixed wireless devices 120, 122, the obtained TA value to be used for other wireless devices 120, 122 in the same group of fixed wireless devices 120, 122, e.g. by means of a first indicating module 440.

9. The network node, 110, 130 according to any of the claims 12-19, further being configured to:

indicate that the wireless device 120 is a fixed wireless device to an application layer in an application running in any one out of: a cloud 140 and a dedicated server, enabling an operator of any one out of: the cloud 140 and the dedicated server to install a sensor to the wireless devices 120 and/or obtain measurements from the wireless devices 120, e.g. by means of a second indicating module 450.

Further Extensions and Variations

Figure 8:
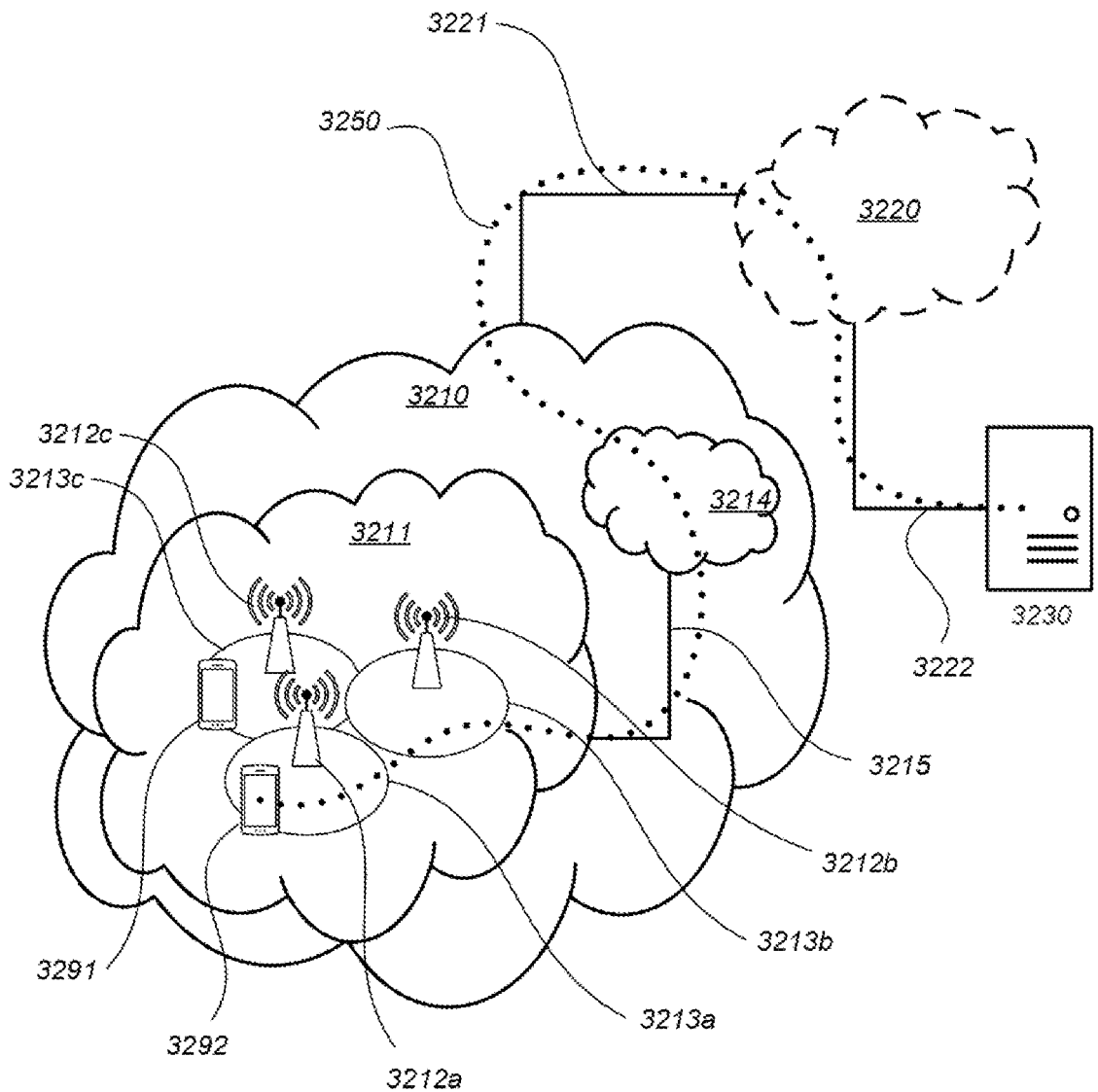
FIG. 8 schematically illustrates a telecommunication network connected via an intermediate network to a host computer.

With reference to FIG. 8, in accordance with an embodiment, a communication system includes a telecommunication network 3210 such as the wireless communications network 100, e.g. a WLAN, such as a 3GPP-type cellular network, which comprises an access network 3211, such as a radio access network, and a core network 3214. The access network 3211 comprises a plurality of base stations 3212a, 3212b, 3212c, such as the network node 110, 130, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the wireless device 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8 as a whole enables connectivity between one of the connected UEs 3291, 3292 and the host computer 3230. The connectivity may be described as an Over-The-Top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 9. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 9) served by the base station 3320. The communication interface 3326 may be configured to facilitate a connection 3360 to the host computer 3310. The connection 3360 may be direct or it may pass through a core network (not shown in FIG. 9) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 9 may be identical to the host computer 3230, one of the base stations 3212a, 3212b, 3212c and one of the UEs 3291, 3292 of FIG. 8, respectively. This is to say, the inner workings of these entities may be as shown in FIG. 9 and independently, the surrounding network topology may be that of FIG. 8.

Figure 9:
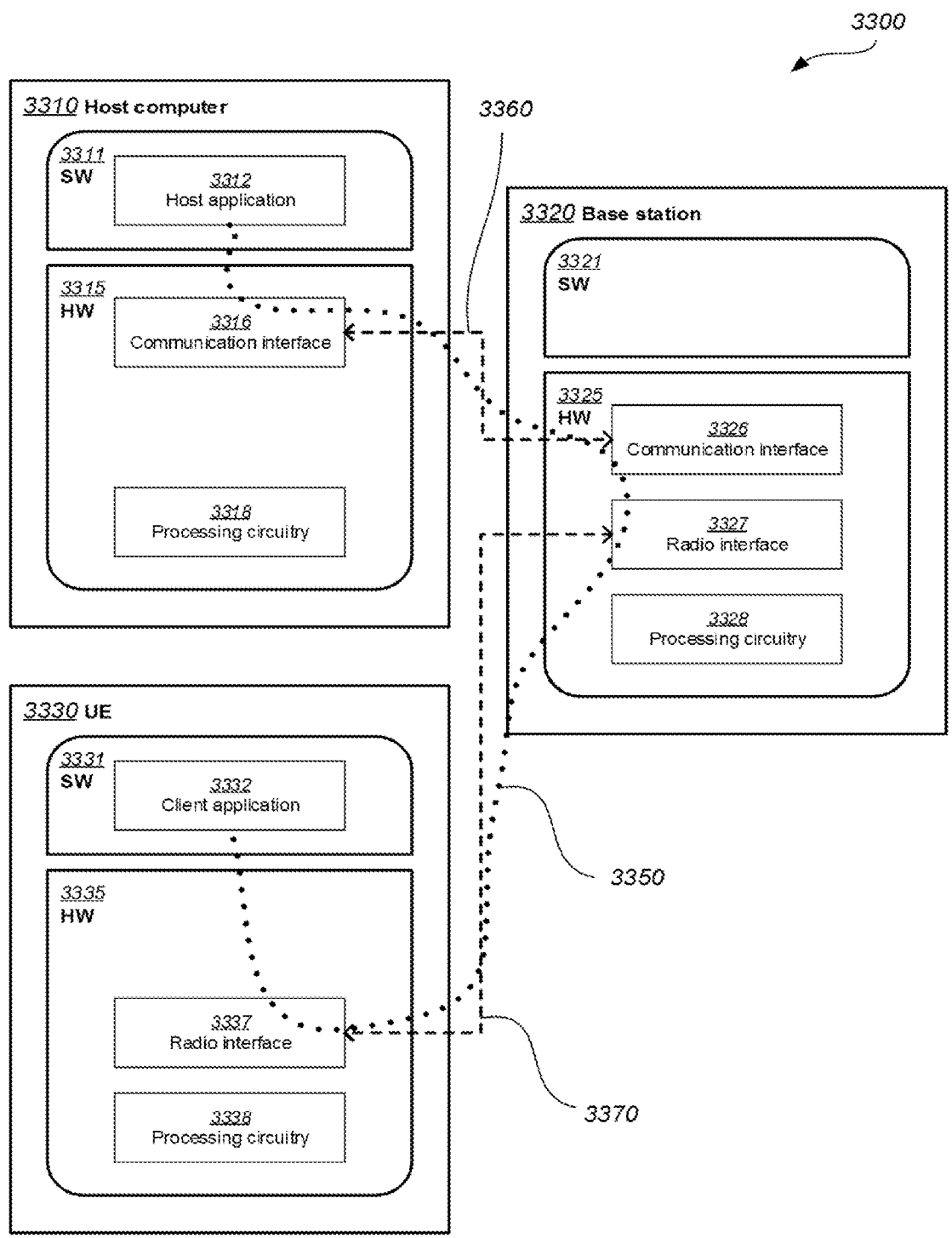
FIG. 9 is a generalized block diagram of a host computer communicating via a base station with a user equipment over a partially wireless connection.

In FIG. 9, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption, and thereby provide benefits on the OTT service such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 10 is a flowchart illustrating a method implemented in a communication system, in accordance with one embodiment. The communication system includes a host computer, a base station such as a AP STA, and a UE such as a Non-AP STA which may be those described with reference to FIG. 8 and FIG. 9. For simplicity of the present disclosure, only drawing references to FIG. 10 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 11 is a flowchart illustrating a method implemented in a communication system, in accordance with one embodiment. The communication system includes a host computer, a base station such as a AP STA, and a UE such as a Non-AP STA which may be those described with reference to FIG. 8 and FIG. 9. For simplicity of the present disclosure, only drawing references to FIG. 11 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figures 12, 13:
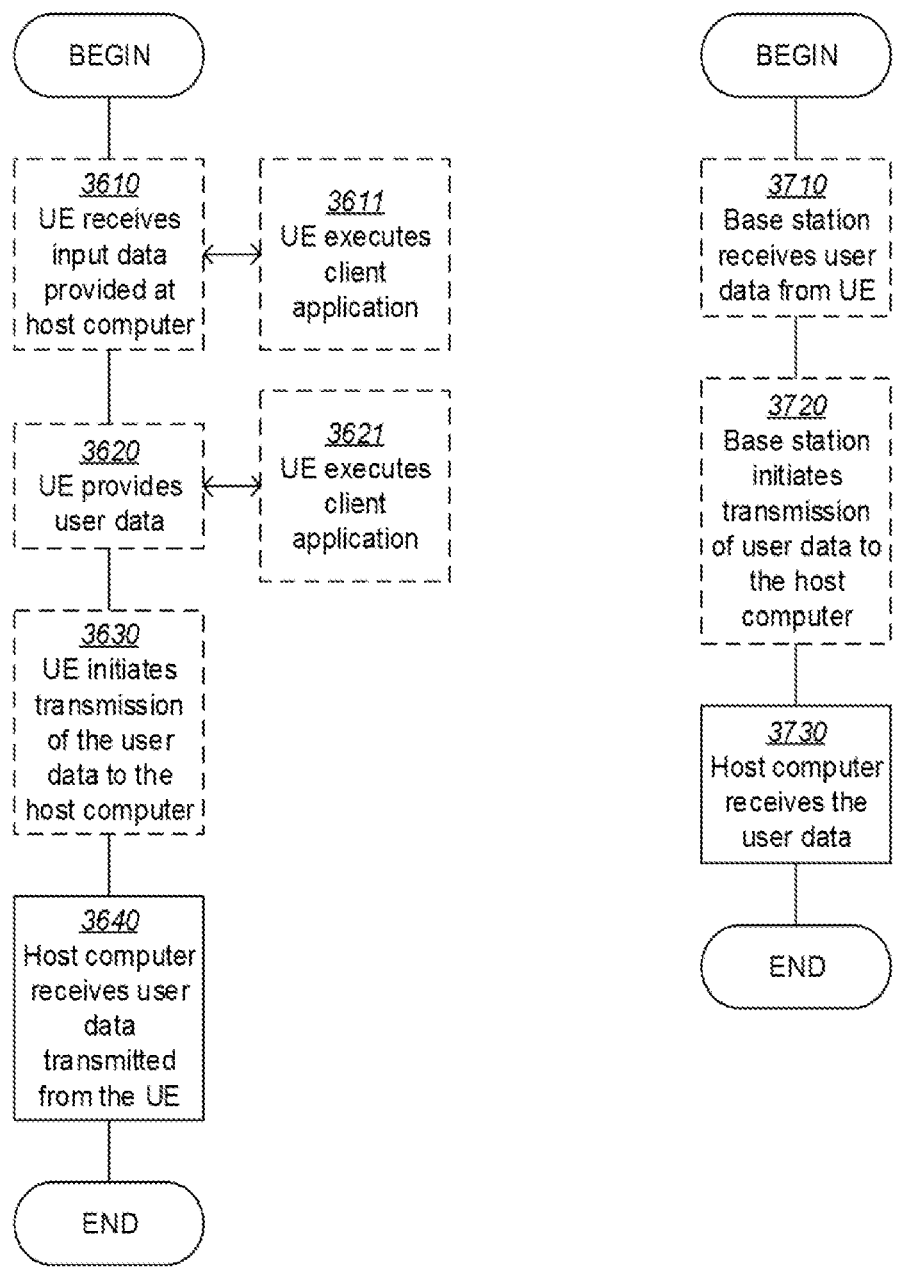

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 8 and FIG. 9. For simplicity of the present disclosure, only drawing references to FIG. 12 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station such as a AP STA, and a UE such as a Non-AP STA which may be those described with reference to FIG. 8 and FIG. 9. For simplicity of the present disclosure, only drawing references to FIG. 13 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

ABBREVIATION EXPLANATION

TA Timing Advance
CE Coverage Enhancement
IoT Internet of things
DL/UL Downlink/Uplink

The invention claimed is:

1. A method performed by a network node, for planning radio resources for transmissions, the method comprising:
    establishing that a wireless device in a group of fixed wireless devices is fixed, fixed comprising always being served by the same one or more access points,
    obtaining a configuration, which configuration comprises an identity of the wireless device and associated parameters to be used for transmissions between the network node and the wireless device, which parameters comprise: an identity of the one or more access points serving the wireless device, an identity of the group of fixed wireless devices and any one or more out of: time and periodicity, for transmissions between the network node and the wireless device, and
    based on the configuration, planning radio resources available in the network node for upcoming transmissions between the network node and any wireless device.

2. The method according to claim 1, wherein the parameters further comprise any one or more out of:
    a Timing Advance, TA, value,
    quality of service,
    priority, and
    dedicated resource need.

3. The method according to claim 1, wherein the parameters further comprise a TimingAdvance, TA, value, wherein the TA value is obtained by measuring an uplink transmission of the wireless device in the group of fixed wireless devices, and wherein the TA value applies to all of the wireless devices in the group of fixed wireless devices.

4. The method according to claim 1, wherein the parameters further comprise a TimingAdvance, TA, value, wherein the TA value is obtained from any one wireless device in the group of fixed wireless devices, which TA value is based on an accurate geographical position of the wireless device mapped to a TA value broadcasted in System Information, SI.

5. The method according to claim 4, further comprising:
    indicating, to the other wireless devices in the group of fixed wireless devices, the obtained TA value to be used for other wireless devices in the same group offixed wireless devices.

6. The method according to claim 1, wherein planning radio resources available in the network node comprise: optimizing resource consumption for any one or more out of: random access, scheduling of user data, and paging messages.

7. The method according to claim 1, wherein establishing that the wireless device is fixed further comprises establishing that the wireless device is any one or more out of: a Narrowband Internet of Things (NB-IoT) device, an enhanced Machine-Type Communication (eMTC) device and a Category M1 (CAT-M) device, a WiFi device, a Long Term Evolution (LTE) device and a New Radio (NR) device.

8. The method according to claim 1, further comprising:
    indicating that the wireless device is a fixed wireless device to an application layer in an application running in any one out of a cloud and a dedicated server,
    enabling an operator of any one out of the cloud and the dedicated server to install a sensor to the wireless devices and/or obtain measurements from the wireless devices.

9. A non-transitory computer-readable storage medium on which is stored a computer program comprising instructions, which when executed by a processor of a network node, causes the processor to:
    establish that a wireless device in a group of fixed wireless devices is fixed, fixed comprising always being served by the same one or more access points,
    obtain a configuration, which configuration comprises an identity of the wireless device and associated parameters to be used for transmissions between the network node and the wireless device, which parameters comprise: an identity of the one or more access points serving the wireless device, an identity of the group of fixed wireless devices and any one or more out of: time and periodicity, for transmissions between the network node and the wireless device, and
    based on the configuration, plan radio resources available in the network node for upcoming transmissions between the network node and any wireless device.

10. The non-transitory computer-readable storage medium of claim 9, wherein the parameters further comprise any one or more out of:
- a Timing Advance, TA, value,
- quality of service,
- priority, and
- dedicated resource need.

11. A network node, for planning radio resources for transmissions, the network node, comprising processing circuitry configured to:
- establish that a wireless device in a group of fixed wireless devices is fixed, fixed comprising always being served by the same one or more access points,
- obtain a configuration, which configuration comprises an identity of the wireless device and associated parameters to be used for transmissions between the network node and the wireless device, which parameters comprise: an identity of the one or more access points serving the wireless device, an identity of the group of fixed wireless devices and any one or more out of: time and periodicity, for transmissions between the network node and the wireless device, and
- based on the configuration, plan radio resources available in the network node for upcoming transmissions between the network node and any wireless device.

12. The network node, according to claim 11, wherein the parameters comprise any one or more out of:
- timing advance, TA,
- value, quality of service,
- priority, and
- dedicated resource need.

13. The network node, according to claim 11, wherein the parameters further comprise a Timing Advance, TA, value, wherein the TA value is obtained by measuring an uplink transmission of the wireless device in the group of fixed wireless devices, and wherein the TA value applies to all of the wireless devices in the group of fixed wireless devices.

14. The network node, according to claim 11, wherein the parameters further comprise a Timing Advance, TA, value, wherein the TA value is obtained from any one wireless device in the group of fixed wireless devices, which TA value is based on an accurate geographical position of the wireless device mapped to a TA value broadcasted in System Information, SI.

15. The network node, according to claim 14, wherein the processing circuitry is further configured to:
- indicate to the other wireless devices in the group of fixed wireless devices, the obtained TA value to be used for other wireless devices in the same group of fixed wireless devices.

16. The network node, according to claim 11, wherein the processing circuitry is configured to plan radio resources available in the network node by optimizing resource consumption for any one or more out of: random access, scheduling of user data, and paging messages.

17. The network node, according to claim 11, wherein the processing circuitry is configured to establish that the wireless device is any one or more out of: a Narrowband Internet of Things (NB-IoT) device, an enhanced Machine-Type Communication (eMTC) device and a Category M1 (CAT-M) device, a WiFi device, a Long Term Evolution (LTE) device and a New Radio (NR) device.

18. The network node, according to claim 11, wherein the processing circuitry is configured to indicate that the wireless device is a fixed wireless device to an application layer in an application running in any one out of a cloud and a dedicated server, enabling an operator of any one out of the cloud and the dedicated server to install a sensor to the wireless devices and/or obtain measurements from the wireless devices.

* * * * *